United States Patent [19]

Hirst

[11] Patent Number: 4,564,933

[45] Date of Patent: Jan. 14, 1986

[54] SUPERVISION OF DIGITAL TRANSMISSION SYSTEMS

[75] Inventor: Ian J. Hirst, London, England

[73] Assignee: International Standard Electric Corporation, New York, N.Y.

[21] Appl. No.: 526,728

[22] Filed: Aug. 26, 1983

[30] Foreign Application Priority Data

Sep. 15, 1982 [GB] United Kingdom ............. 8226315

[51] Int. Cl.$^4$ .......................... H04J 1/16; H04J 3/14; H04B 3/46
[52] U.S. Cl. .............................. 370/15; 179/175.31 R; 371/22
[58] Field of Search ............................ 370/15, 16, 88; 179/175.31 R, 175.3 F; 371/11, 22

[56] References Cited

U.S. PATENT DOCUMENTS

| | | | |
|---|---|---|---|
| 3,290,451 | 12/1966 | Duimelaar ................. | 179/175.31 R |
| 3,692,964 | 9/1972 | Camiciottoli et al. ..... | 179/175.31 R |
| 3,739,098 | 6/1973 | Camiciottoli et al. ..... | 179/175.31 R |
| 3,760,127 | 9/1973 | Camiciottoli et al. ..... | 179/175.31 R |
| 4,069,402 | 1/1978 | Mantorani et al. ......... | 371/22 |
| 4,161,635 | 7/1979 | Wolarer ...................... | 179/175.31 R |
| 4,402,075 | 8/1983 | Bargeton et al. ............ | 370/15 |

*Primary Examiner*—Douglas W. Olms
*Assistant Examiner*—Frank M. Scutch, III
*Attorney, Agent, or Firm*—John T. O'Halloran; Peter R. Ruzek

[57] ABSTRACT

A supervisory method for a digital optical submerged transmission system in which a multi-bit test signal is detected by a repeater while receiving a loop-back signal for causing loop-back condition, and the mix of the bits of the test signal is changed to change a d.c. level derived in the repeater from the test signal. This is compared with a local reference level and after comparison a sign change is indicated the loop-back condition is either enabled or disabled and that event is detected enabling the required input or output level of the repeater to be checked.

15 Claims, 8 Drawing Figures

SUPERVISION OF DIGITAL TRANSMISSION SYSTEMS

BACKGROUND OF THE INVENTION

The present invention relates to a method and apparatus for supervising or controlling a digital transmission system. Transmission systems, particularly submarine transmission systems, include repeaters to amplify the signal along the transmission system and it is clearly necessary that these repeaters are arranged to be supervised remotely. A method that is often used in supervising such repeaters in both analogue and digital systems is "loop-back". In this method, in response to a signal from a terminal station, a loop is established at a repeater, which returns signals, sent on the "send" path, back to the same station on the "receive" path. Thus by looping back at various repeaters the location of faults may be established. Such loop-back may be used not only to establish, for example, cable breaks or serious faults in repeaters, but may preferably also be usable to monitor remotely the quality of the system performance and thereby give early warning of system degradation.

A variety of methods can be used to set up the loop and the present invention in one aspect is concerned with supervising the repeater once a loop-back condition has been established to check functions such as signal level in, signal level out, D.C. levels. ecetera.

SUMMARY OF THE INVENTION

According to one aspect of the present invention there is provided a method of supervising a digital transmission system having one or more repeaters and separate go and return paths, comprising sending a loop-back signal for a loop-back condition from one side of a repeater via the repeater and the go and return paths, and sending a digital multi-bit test signal from the other side of the repeater and controlling the mix of the bits of the test signal to release or enable the loop-back condition in the repeater in such manner as to determine the test signal level in the repeater which caused the event.

According to another aspect of the present invention there is provided a digital transmission system having a pair of terminals, one or more repeaters and separate go and return paths, comprising means for sending a loop-back signal to the repeater from one side thereof for establishing a loop-back condition in the repeater, means for sending to the repeater a digital multi-bit test signal from the other side of the repeater, the mix of the bits in the test signal being controlled, and loop-back circuitry in the repeater sensitive to the test signal to release or enable the loop-back condition in the repeater, and means at one of the terminals to determine the test signal level which caused the event.

There are various methods that can be used to switch each repeater into loop-back mode, e.g. signals sent via frequency modulation of the clock or using the techniques described in British Patent Specification 2,051,355A.

Preferably the loop-back condition is first established and the test signal is changed until the loop-back condition is disabled. Preferably also the loop-back signal comprises an M-bit word formed by two different bit patterns. In a particular embodiment the different bit patterns are 101010 . . . and 110011001100 . . . .

The repeater detects the loop-back signal and preferably at the repeater the fundamental frequency B/M is filtered and used to control loop-on, B being the data bit rate.

In order to select different repeaters the word length is different for each repeater to produce in any repeater a frequency unique thereto for selecting that repeater to loop-back.

There are two ways the measurement of the wanted signal can be made. In one the bit amplitude of the test signal in the repeater is determined by comparing a d.c. level derived from the test signal with a known d.c. level and varying the mix of the bits until said event occurs.

In another the bit amplitude of the test signal is known, a predetermined d.c. level is produced by varying the mix of the bits of the test signal, and the known d.c. level is compared with an unknown d.c. level which is determined when said event occurs.

According to another aspect of the invention there is provided a repeater for a digital transmission system, the repeater having two digital regenerators for respectively separate go and return paths of the system, loopback circuitry sensitive to receipt of a loop-back signal from a terminal of the system to establish a loop-back condition between the go and return paths of the system, a comparator arrangement which compares a reference signal level with the signal level derived from an incoming multi-bit test signal and in response thereto enables or releases the loop-back condition when the compared signals bear a predetermined relationship.

BRIEF DESCRIPTION OF THE DRAWING

A preferred embodiment of the invention will now be described by way of example only, and with reference to the accompanying drawings in which.

DESCRIPTION OF THE PREFERRED EMBODIMENT

The supervisory system to be described is as follows:

(a) The method is based on complete looping of the data stream and therefore it is an out of service test.

(b) The fibres will be arranged in pairs, each pair having a go and return fibre.

(c) Looping is initiated by means of a special signal sent from either terminal. The 'loop-on' signal is a maintaining signal and not a latching signal i.e. removal of the 'loop-on' signal causes the loop to disengage and normal terminal to terminal transmission to be restored.

(d) Normal transmission is from terminal A to terminal B over one fibre of the pair and from terminal B to terminal A on the other fibre. Loop transmission is from terminal A to terminal A and terminal B to terminal B.

(e) When one terminal initiates loop-back, that terminal will receive back the 'loop-on' signal. The other terminal is now free to use the other loop for testing with any pattern.

(f) The free terminal can send a special signal which will enable the repeater input signal level to be monitored.

(g) The 'loop-on' signal has two states:
(i) Repeater input signal level can be determined
(ii) Repeater input signal level cannot be determined.

Figure 1:
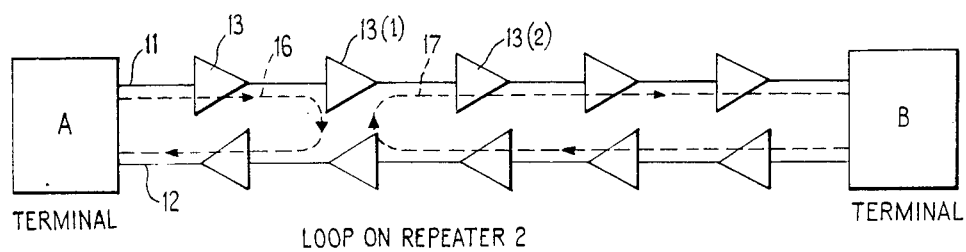
FIG. 1 shows, in diagrammatic form, a digital communication transmission system.

Referring to FIG. 1, there is shown in diagrammatic form a digital communications transmission system which may, for example, be an optical submarine transmission system. Terminals A and B are provided at respective ends of the transmission system, the transmission system including two separated optical fibre transmission paths 11, 12, transmission path 11 being for signals passing from terminal A to terminal B, and transmission path 12 being for signals from B to A. Each transmission path 11, 12, includes spaced repeaters 13 which amplify the signal received to overcome attenuation losses along the length of the transmission system.

As has already been described, the repeaters may be supervised by arranging circuits within them such that the two transmission paths 11, 12 are joined at a repeater to provide a loop-back and this is shown by the dotted signal paths 16, 17 in FIG. 1. Thus any signal passed from terminal A will be looped back by signal path 16 via repeater 13(1) to terminal A, and similarly any signal passed from terminal B will be looped back via repeater 13(1) along signal path 17 to return to terminal B.

Clearly means must be provided to operate the repeater and each repeater must have some means for reacting to a unique signal (the loop-on signal) sent from either terminal A or terminal B to cause it to switch to loop-back mode.

Figure 2:
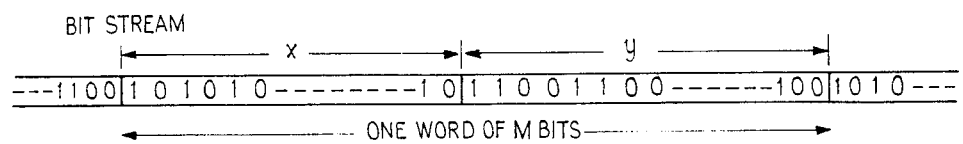
FIG. 2 shows in diagrammatic form the bit stream of the loop-back signal.

The method of signalling to a repeater is by detecting a spectral component of a signal. The signal chosen is shown in FIG. 2 and consists of a stream of digital words M-bits long.

Figure 3:
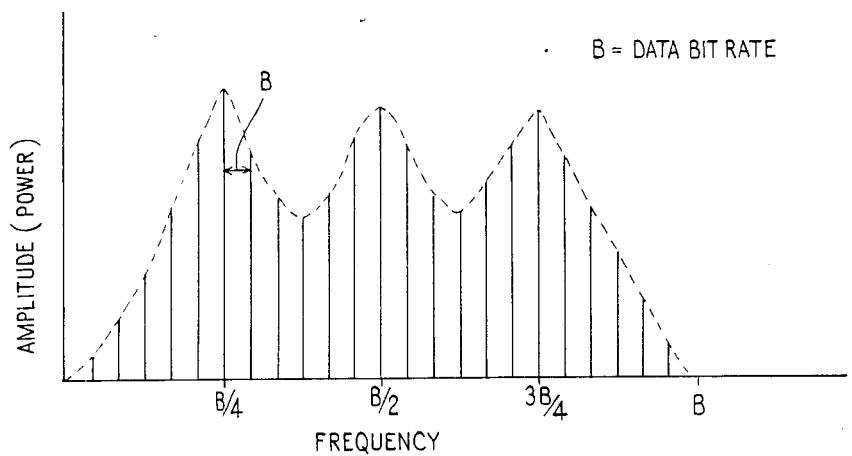
FIG. 3 shows the spectrum of the Fourier analysed digital stream.

The test pattern length is M-bits and the M-bit word is divided into two parts, x and y. The x part is the bit pattern 101010 etc., and the y part is the pattern 11001100 etc. The spectrum or Fourier analysis of such a word is shown in FIG. 3.

The frequency spacing of the sidebands around the B/4, B/2 and 3B/4 lines is B/M. The B/4 and 3B/4 lines and their sidebands are produced by the 11001100 pattern while the B/2 line and its sidebands are produced by the 10101010 pattern.

Figure 4:
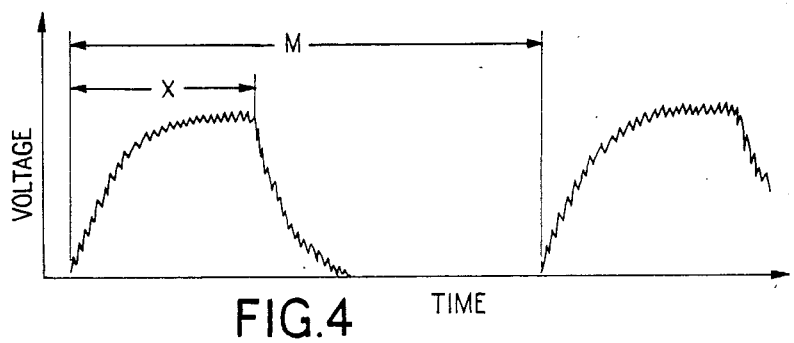
FIG. 4 shows the envelope-detected loop-back signal (point 4 in FIG. 8) in the repeaters.

The signal in the repeater is picked off and bandpass filtered either at B/4 or B/2 and then envelope detected. The result is shown in FIG. 4.

The output of the envelope has a fundamental frequency at B/M together with harmonics of B/M.

This signal is now passed through a narrow-band pass filter (crystal) centred at B/M to extract the fundamental frequency B/M, then detected to produce a d.c. voltage which is used to control the looping circuitry in the repeater.

Figure 5:
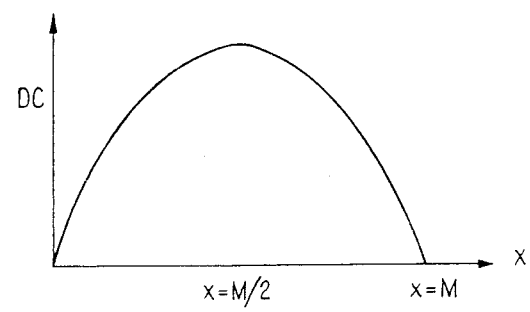
FIG. 5 shows how the control voltage derived from the loop-back signal varies with pattern ratio.

Note that the size of the control voltage produced depends on x as shown in FIG. 5.

By varying M, the frequency of tone (B/M) can be altered and by varying x, the size of the d.c. produced can be changed. Note that the frequencies that can be produced will occur in steps as M is an integer. Thus by varying M, different frequencies can be produced so that each repeater can have a unique frequency which is collected by a narrow-band filter tuned to B/M. Therefore, repeaters can be selected by providing different bandpass filters at each repeater and by changing the wordlength.

Such a loop-back method enables faults to be identified in position to at least one repeater. For example if there is a break in the transmission line between repeater 13(1) and 13(2) the loop-back signals will be returned to terminal A from all repeaters when looped back, between terminal A and terminal 13(1) but terminal 13(2) will not return a loop-back signal.

Whilst such an arrangement is very useful, it may be developed so as to provide information about other repeater functions such a signal level in, signal level out, d.c. levels within the repeater and the like.

Figure 6:
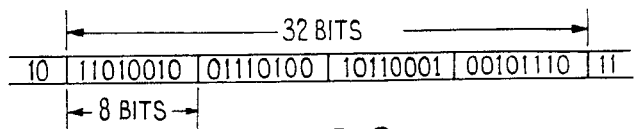
FIG. 6 shows in diagrammatic form the bit stream of the test signal.

When one of the repeaters has been placed in a loop-back condition by sending the 'loop-on' signal from one terminal, the other terminal is free to send a special test signal which will enable the signal level to be measured in that repeater from the terminal. The method is as follows:

A 32 bit word is sent from the terminal as shown in FIG. 6.

Figure 7:
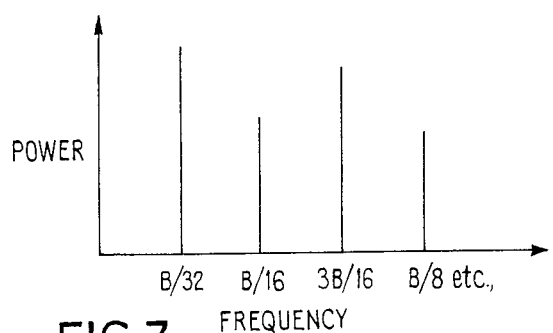
FIG. 7 shows the power spectrum of the test signal.

The spectrum of any 32 bit word is of the form shown in FIG. 7.

The size of each component will depend on the mix of bits in the word and also on the power in each bit. For the example shown the fundamental power (at B/32) will be $-12.34$ dBm, if peak to peak pulse amplitude is 1 volt in 50 Ohms.

In order to measure the signal level at a particular point the fundamental frequency (B/32) is extracted at that point, amplified, rectified and compared with a standard voltage. This mix of bits is altered until the comparison changes sign and therefore the signal level is known. Signalling to the terminal can be accomplished by turning the loop off in the repeater when the comparison changes sign. Thus the 32 bit word becomes a 'loop-off' signal.

If any other pattern or random sequence is used, it might produce components at the B/32 frequency and hence turn the loop off. In order to avoid this possibility, the x part of the 'loop-on' signal can be increased to produce a larger d.c. 'loop-on' signal (say 6 dB) which can be arranged so that it now overrides anything produced by the 'loop-off' signal.

It can be shown that if a 32 bit word is assembled using 7B8B code words of zero disparity, then the range of fundamental level will be 35 dB with no step being greater than 0.1 dB.

Figure 8:
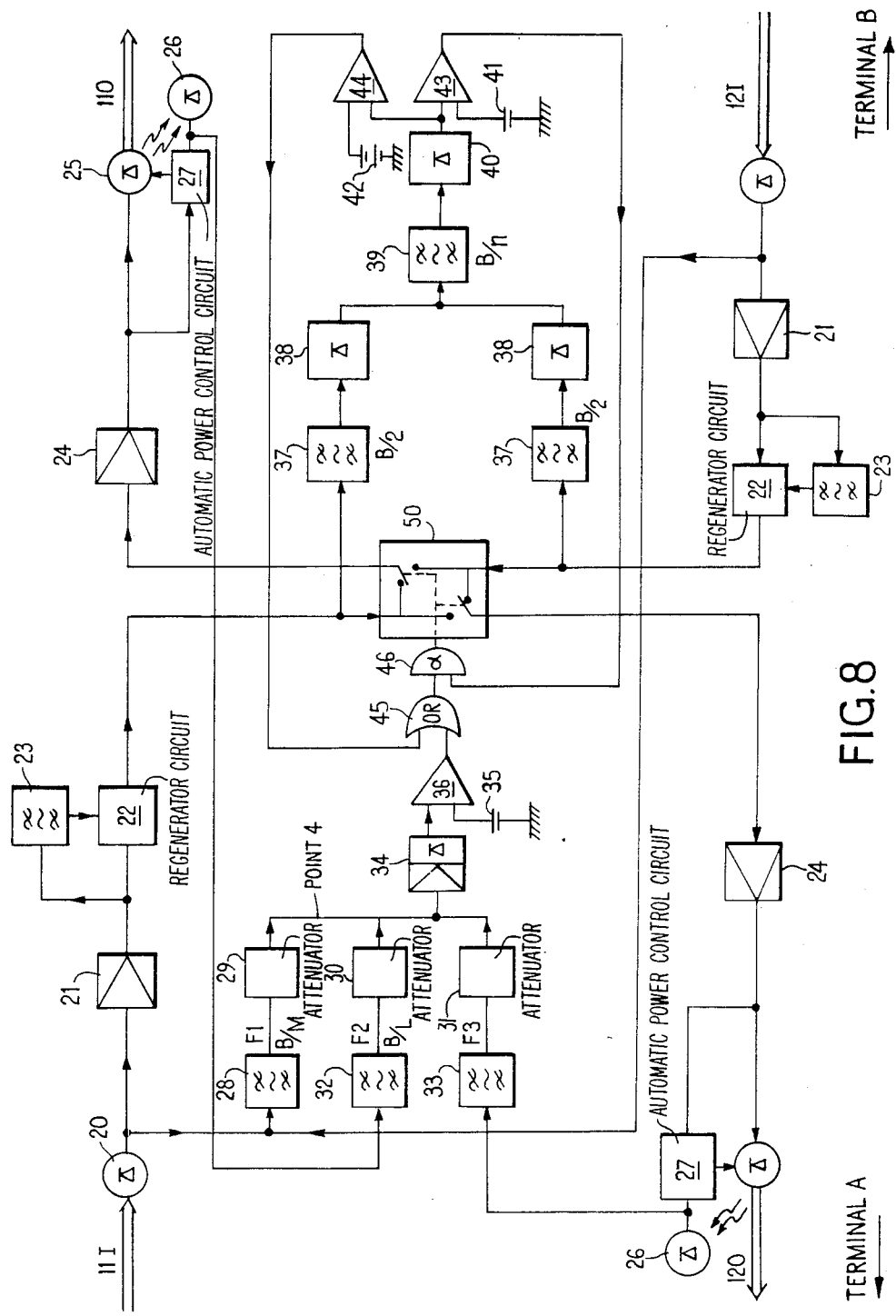
FIG. 8 is a block schematic diagram of a digital repeater for an optical submerged transmission system of FIG. 1.

FIG. 8 shows a particular preferred arrangement for loop-back and measurement of input and output levels for one of the optical digital repeaters 13 of FIG. 1.

As discussed the repeater has a pair of one-way regenerator sections each operating in different directions.

Most of the components of the two regenerators are similar and like components have been given like reference numerals.

The input and output of the repeater are connected to optical transmission lines 11 and 12. The repeater comprises an optical electrical converter 20 for converting light from the transmission line 11I into electrical energy, an amplifier 21 for amplifying the electrical signals from the converter, a regenerator circuit 22 for the regeneration of the digital signal, and a timing extraction circuit 23 which extracts the timing signal from the received signal and passes it to the regenerator circuit 22. A changeover switch 50 enables signals from either regenerator to be passed to the next repeater or looped back in the direction they came from, a driving amplifier 24 enables the digital signals to be impressed on a laser 25 for converting electrical signals from the driving amplifier into optical signals, which are sent into the output optical transmission line 110. Part of the output optical signal is coupled to an optical electrical converter 26 whose electrical output is used together with an output from the driving amplifier 24 in an automatic power control circuit 27 which controls the average light output of the laser 25 to a constant level.

Part of the outputs of the input optical electrical converter 20 is passed to a narrow-band filter 28 tuned to F1 whose output is connected to an attenuator 29, whose output is fed to a circuit 34 which amplifies, rectifies and smoothes to produce a d.c. voltage. This d.c. voltage is compared with a standard voltage 35 derived from the line supply voltage in a comparator 36 whose output is a "1" if the standard voltage is greater than the d.c. from 34 and a "0" if less. In a similar fashion the outputs of the optical electrical converters 26 are filtered by narrow-band filters 32 and 33 tuned to F2 and F3 respectively whose outputs are attenuated by attenuators 30 and 31, and then fed to the input of 34. The attenuators are thus able to control the relative levels of the frequencies F1, F2 and F3.

Part of the outputs of the regenerators 22 is fed into a narrow-band filter 37 tuned to B/2 (B is the clock frequency). The outputs of these filters 37 are fed to envelope detectors 38 whose outputs are combined and fed to narrow-band filter 39 tuned to B/m which is unique to each repeater in the system. The output of the narrow-band filter 39 is rectified and smoothed in circuit 40 to produce a d.c. voltage. This d.c. voltage is compared in a comparator 43 with a standard voltage 41 and the output is a "0" if the standard 41 is greater than the output of 40 and a "1" if less. Similarly, the output of comparator 44 is a "0" if the standard voltage 42 is greater than the output of 40.

The outputs of comparators 36, 43 and 44 are fed to the logic circuits comprising 'OR' and 'AND' circuits 45 and 46. The truth table of the combination is:

| Output of 35 | Output of 42 | Output of 43 | Output of 45 |
| --- | --- | --- | --- |
| 1 | 0 | 0 | 0 |
| 1 | 1 | 0 | 1 |
| 0 | 1 | 0 | 0 |
| 0 | 1 | 1 | 1 |

The output of 46 is used to control the changeover switch 50. If the output of 46 is a "0" then the changeover switch is in the position shown in FIG. 1 and transmission is from terminal A to terminal B and vice versa. When the output is "1" then the changeover switch operates to give a loop-back at that repeater with transmission from terminal A to the repeater and back and from terminal B to the repeater and back.

The operation of the supervisory is as follows: from terminal A or B a loop-on signal is sent to the repeater. One of the narrow-band filters 37 will pick out of the bit stream the frequency B/2 together with some of its sidebands. The output of the filter 37 will consist of a pulsed R.F. signal whose rise and fall times are determined by the bandwidth of the filter 37 and whose duration is determined by the length of the 1010 . . . pattern. As the output of the regenerator has a constant pulse amplitude, the amplitude of the pulsed R.F. signal will also be of constant amplitude. The pulsed R.F. signal is applied to the envelope detector 38 whose waveform will be a pulse whose length is the length of the 1010 . . . pattern and repetition frequency is B/M. This waveform is applied to the narrow-band filter 39 tuned to B/M which is unique to that repeater. The output of the filter 39 will be a sinusoid of frequency B/M and amplitude depending on the length of the 1010 . . . pattern. The sinusoid is detected by 40 and the output compared with a standard voltage 41. The length of the 1010 . . . pattern is adjusted at the terminal until the d.c. output of 40 is greater than the standard voltage 41 and thus produces a logical "1" at the output of comparator 43. If the comparator 36 is already a "1" then the 'AND' gate 46 will change its output from a "0" to a "1" and the loop-back switch 50 operates.

The operation of the level monitoring circuits is as follows:

If one direction has been used to put the repeater into loop-back, the other direction is now free to send a pattern from which a level can be determined. A repetitive word (see FIG. 6) is sent from the other terminal whose repetition rate is the same as the centre of one of the filters 28, 32 or 33.

If the level is to be measured at the output of 20, the receive optical electrical converter, the word length that is sent from the terminal is M where B/M is the frequency to which filter 28 is tuned. This frequency is extracted from the bit stream by 28 and passed through attenuator 29, amplifier detector 34 to produce a d.c. which is compared with standard voltage 35 by comparator 36. The mix of bits in the M bit word is varied until the d.c. from 34 is greater than standard voltage 35 and then the comparator output changes from a "1" to a "0". If the comparator 44 output is "0" then the output of 'OR' circuit 45 is a "0" and hence the output of the 'AND' circuit 46 changes from a "1" to a "0" and the loop-back is disengaged. The circuit gain from the input of 28 to the output of 34 is known (designed to be a stable fixed value) and thus the level of the B/M frequency at the output of 20 is known and hence the pulse amplitude at the output of 20 can be determined from the word that caused the loop to disengage.

Filters 32, 33 are tuned to a different frequency and hence have no output and the other input to filter 28 does not carry any component at frequency B/M; hence only one point in the repeater is monitored.

Measurements at the output of the repeater are made in a different way due to the loop-back switch determining which terminal signal seeks them.

To measure output level, the mix of bits from e.g. terminal B is reduced until the loop-on signal being sent from the other terminal (A) is successful in changing over 46. In more detail, say for example filter 32 is to be used for determining the output level, then a signal is sent from terminal A whose word length is L; filter 32 is tuned to B/L and the mix of bits is adjusted so that the highest possible d.c. is obtained at the output of 34 causing a "0" to be present at the input of the 'AND' gate 46. The loop-back signal is sent from terminal B of such a strength that the output of comparator 43 is a "1" and the output of comparator 44 is a "0". No loop-back occurs as it is held off by the signal from terminal A. The mix of bits in the word sent from terminal A is adjusted so that the d.c. output from the circuit 34 falls, and when it is less than the standard voltage 35, the output of the comparator 36 changes from a "0" to a "1"; switch 50 operates and the loop is now enabled. This also disconnects filter 32 from the B/L signal. The signal frequency B/L is able to pass through optical electrical converter 26 as it is a much lower frequency than B and hence it can be a slow photodiode.

Comparator 44 is operated when the output of 40 is greater than the standard voltage 42, and its output changes from a "0" to a "1". The standard voltage 42 is greater than the standard voltage 41 and thus requires a longer 101010 sequence in the loop-on signal to change the output of comparator 44. When the output of comparator 44 is a "1" the output of the 'OR' circuit 45 is always a "1" and hence the loop-off circuitry will have no effect on the changeover switch 50. Thus the other loop formed by the changeover switch that is not carrying the loop-on signal can carry any pattern, even one with frequency components in the passbands of filters 28, 32 and 33.

I claim:

1. A method of supervising a digital transmission system having two terminals interconnected by separate unidirectional paths, and at least one repeater interposed in and between said paths, comprising sending a loop-back signal for a loop-back condition from one of the terminals via one of the paths to the repeater and via the repeater and the other path back to the one terminal, sending a digital multi-bit test signal from the other terminal via the other path to the repeater, and controlling the mix of the bits of the test signal to change the loop-back condition in the repeater in such manner as to determine the test signal level in the repeater which caused the change.

2. A digital transmission system having a pair of terminals, one or more repeaters and separate undirectional paths, comprising means for sending a loop-back signal to the repeater from one of the terminals for establishing a loop-back condition in the repeater, means for sending to the repeater a digital multi-bit test signal from the other terminal, the mix of the bits in the test signal being controlled, loop-back circuitry in the repeater sensitive to the test signal to change the loop-back condition in the repeater, and means at one of the terminals to determine the test signal level which caused the change.

3. A system as claimed in claim 2, wherein the loop-back condition is first established and the test signal disables the loop-back condition.

4. A system as claimed in claim 2, wherein the loop-back signal comprises an M-bit word formed by two different bit patterns.

5. A system as claimed in claim 4, wherein the two different bit patterns are 101010 ... and 110011001100 . . .

6. A system as claimed in claim 4 wherein at the repeater the fundamental frequency B/M is filtered and used to control loop-on, B being the data bit rate.

7. A system as claimed in claim 4 wherein the word length is different for each repeater to produce in any repeater a frequency unique thereto for selecting that repeater to loop-back.

8. A system as claimed in claim 2, wherein the bit amplitude of the test signal in the repeater is determined by comparing a d.c. level derived from the test signal with a known d.c. level and varying the mix of the bits until said change occurs.

9. A system as claimed in claim 2, wherein the bit amplitude of the test signal is known, a predetermined d.c. level is produced by varying the mix of the bits of the test signal, and the known d.c. level is compared with an unknown d.c. level which is determined when said event occurs.

10. A system as claimed in claim 2, wherein in order to measure the signal level at a particular point in the system the fundamental frequency of the test signal is extracted at that point, compared with a standard locally generated voltage and the mix of bits in the test signal is changed until the comparison changes sign, and determining the signal level from a knowledge of the bit mix and the local generated standard voltage.

11. A method of supervising or controlling a digital transmission system having at least one repeater in the transmission path, comprising sending to the repeater via the path a bit stream divided into identical words of zero disparity, each word being n bit long, filtering at least one of the fundamental and harmonic frequencies, deriving from the filtered signal in the repeater a first d.c. signal whose level is dependent on the mix of the bits, comparing the d.c. signal with a second d.c. signal in the repeater, and varying the mix of the bits during the comparison to establish the level of the first and second d.c. signals relative to one another by operating a switch in the repeater.

12. A repeater for a digital transmission system, the repeater having two digital regenerators for respectively separate unidirectional paths of the system, loop-back circuitry sensitive to receipt of a loop-back signal from a terminal of the system to establish a loop-back condition between the unidirectional paths of the system, and a first comparator arrangement which compares a reference signal level with another signal level derived from and representative of a succession of incoming multi-bit test signals with different Fourier transforms and in response thereto changes the loop-back condition when the compared signal levels bear a predetermined relationship.

13. A repeater as claimed in claim 12, comprising a first broadband filter, an envelope detector and a second narrow band filter, in that order, to derive from the loopback signal a frequency unique to that repeater, and a third filter to select the test signal.

14. A repeater as claimed in claim 12, wherein the reference signal level is derived from the line supply voltage which powers the repeater.

15. A repeater as claimed in claim 12, including a second comparator arrangement which compares the level of the loop-back signal with a reference level and forwards the loop-back signal, when the compared signals bear a predetermined relationship, for further comparison with the received test signal to change the loop-back condition.

* * * * *